United States Patent
Daiber

(10) Patent No.: US 6,237,113 B1
(45) Date of Patent: May 22, 2001

(54) METHOD OF INITIALIZING A CONTROL UNIT CONNECTED TO A DIAGNOSTIC BUS

(75) Inventor: Martin Daiber, Ostfildern-Ruit (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/159,150

(22) Filed: Sep. 23, 1998

(30) Foreign Application Priority Data

Sep. 24, 1997 (DE) .............................. 197 42 088

(51) Int. Cl.⁷ ........................................ H02H 3/05

(52) U.S. Cl. ................... 714/43; 714/30; 712/29

(58) Field of Search .................. 714/43, 30, 48; 712/29; 711/4; 710/68; 327/142, 227; 341/67; 375/347; 382/232; 701/45

(56) References Cited

U.S. PATENT DOCUMENTS

| | | | |
|---|---|---|---|
| 4,967,344 | * 10/1990 | Scavezze et al. ........... | 714/4 |
| 5,304,935 | 4/1994 | Rathke et al. . | |
| 5,526,311 | 6/1996 | Kreifels et al. . | |
| 5,706,297 | * 1/1998 | Jeppesen, III et al. ........... | 714/30 |
| 5,729,169 | * 3/1998 | Roohparvar ........... | 327/227 |
| 5,790,572 | * 8/1998 | Oguro et al. ........... | 714/798 |

OTHER PUBLICATIONS

Baratz, Alan and Segall, Adrian, "Reliable Link Initialization Procedures", Feb. 1988, IEEE Transactions On Communications vol. 36 pp. 144–152.*

* cited by examiner

Primary Examiner—Robert Beausoleil
Assistant Examiner—Rita A Ziemer
(74) Attorney, Agent, or Firm—Kenyon & Kenyon

(57) ABSTRACT

A method of initializing a control unit connected to a diagnostic bus by a trigger word using signals on the diagnostic bus over the RXD line of a microcontroller having a port register and a receive buffer register. According to this method, information is sampled from the port register for the low/high logic state with a predetermined sampling cycle to detect the trigger word, and a readout of the receive buffer register and an analysis of the status information are performed. To prevent unintentional initialization or triggering of the control unit, a check at the sampling time during input of the trigger word is performed to determine whether the receive buffer register is full or whether there is a transition from the high logic signal level to the low logic signal level on the K line of the diagnostic bus, in which case a trigger word causes a framing error in this test. Further, an initialization of the control unit is accepted if there is a framing error; otherwise, the initialization is discarded and another transition from, for example, a high logic signal level to a low logic signal level is waited for.

6 Claims, 2 Drawing Sheets

START BIT | INITIALIZATION ADDRESS | STOP BIT | SSP CKEY 2
KEY1 CADR
KEY2→COMMUNICATION

METHOD OF INITIALIZING A CONTROL UNIT CONNECTED TO A DIAGNOSTIC BUS

FIELD OF THE INVENTION

The present invention relates to a method of initializing a control unit connected to a diagnostic bus.

BACKGROUND INFORMATION

In automotive engineering, for example, individual units are connected by a bus system (ISO 14230 Road Vehicle Diagnostic System) such as a data transmission line (K line, KWP 2000/Key Word Protocol 2000) over which the units communicate with an external automotive tester.

One example of such a unit is a vehicular airbag system, which has a control unit to deploy airbags in a motor vehicle if necessary on the basis of collision signals. The bus system connected to the control unit for this purpose has a diagnostic bus to detect any malfunction of the respective unit and to display the results.

To initialize or trigger a control unit connected to a diagnostic bus, the signals of the communication bus forming another part of an overall bus system containing the diagnostic bus are analyzed over the received data line or RxD line (RxD stands for received data line) of a microcontroller contained in the control unit. This is done on the basis of an initializing word or trigger word, in particular a 5-baud trigger word in two ways:

1) Sampling for high/low logic state is performed in a predetermined sampling cycle of preferably 10 ms. The corresponding information is read directly out of a port register (parallel interface register) of an interface between the control unit and the diagnostic bus.

2) The receive buffer register is read out and its status information is analyzed. Input is entered into the receive buffer register as soon as there is a transition from the high logic signal level to the low logic signal level on the bus, with the sampling of diagnostic information being performed by the bus interface receiver itself.

Initialization of the diagnostic bus achieved in this way (shown schematically in FIG. 2) is not reliable enough because there is no guarantee that the control unit connected to the diagnostic bus will be initialized or triggered unintentionally, e.g. by communication data from the tester or other stations.

SUMMARY OF THE INVENTION

According to the present invention, an initialization is reliably blocked or suppressed if the trigger word has not been recognized clearly or at all. In other words, the initialization is discarded and a new initialization is awaited if there is only one filled received byte having no framing error (stop bit 0 of the receive buffer register) during trigger word initialization (first criterion).

In an especially advantageous manner, after the end of the trigger word and until transmission of a speed synchronization pattern SSP, another monitoring interval is inserted and a check is performed to determine whether or not a transition from a high logic signal level to a low logic signal level is detected during this interval, with the initialization being discarded when this transition is detected due to a filled received byte. This is a second criterion with which it is possible to reliably prevent a control unit connected to the diagnostic bus from being triggered or initialized unintentionally.

A third criterion is that an initialization mode forming part of a traditional circuit for implementation of the diagnostic bus is switched to the "inactive" status as soon as the initialization procedure is concluded and a communication has started. This measure prevents interference from self-sent signals which might be interpreted incorrectly, and it guarantees that signals from other control units connected to the bus will not be interpreted as additional triggering or initialization.

DETAILED DESCRIPTION

Figure 1A:
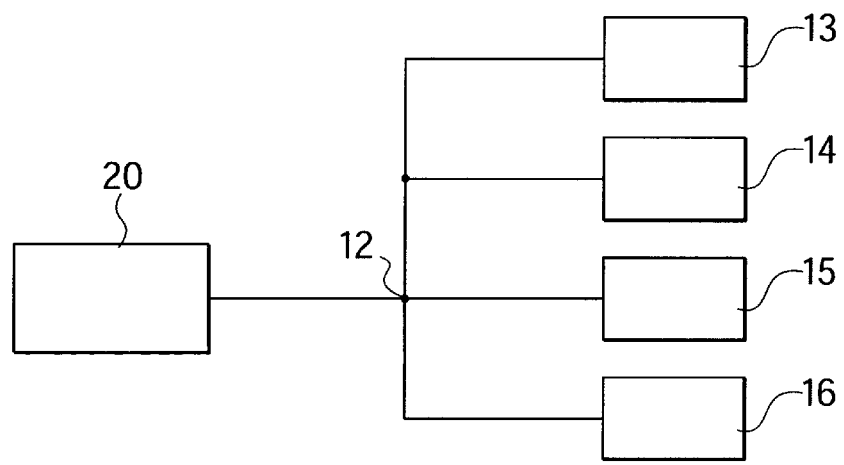
FIG. 1a shows a block diagram of a bus system.

FIG. 1a shows a general communication bus in a motor vehicle. A tester 20 with decentralized control units (ECU= electronic control unit) 13, 14, 15, 16 are maintained on a K line 12.

Figure 1B:
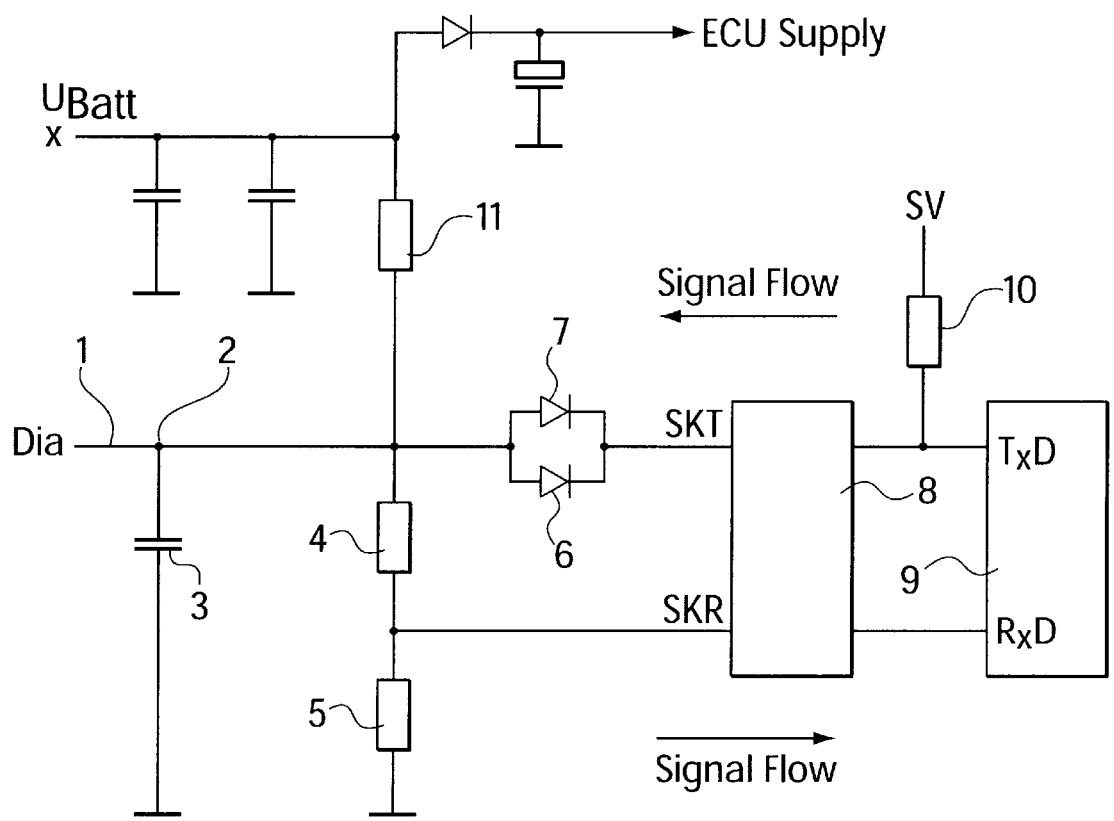
FIG. 1b shows a schematic diagram of a control unit connected to a diagnostic bus.

FIG. 1b shows a schematic diagram of a control unit which forms part of an airbag system based on a K line and is connected to a diagnostic bus 1 at the input end. The control unit of FIG. 1b includes an input 2 connected to ground across a capacitor 3 for interference suppression of incoming signals. A voltage divider, which has two series-connected resistors 4 and 5, is connected to input 2 and receives a power supply voltage $U_{BATT}$, which is decoupled across a resistor 11 to supply a voltage level of $U_{BATT}$ at the point of common coupling of resistors 4 and 5 if no communication takes place (default value for reception). Two parallel-connected diodes 6 and 7 which are connected to the input terminal 2 and are wired so that their anodes receive the input signal while their cathodes are connected jointly to the output of an interface 8 in order to decouple the communication bus from a non-transmitting airbag control unit. The decoupled power supply voltage is also sent across resistor 11.

At the input end, interface 8 is connected via SKR to the tap of voltage divider 4, 5 (low=−0.30 V to 2.1 V, high=2.8 V to $U_{BATT}$+1 V), and at the output end it is connected to the RxD input (RxD stands for received data) of a microcontroller 9 whose TxD output (TxD stands for transmission data) is connected to the input of interface 8 and to the stabilized internal device power supply SV across a resistor 10. At the output end, interface 8 is connected to two parallel-connected diodes 6 and 7.

Figure 2:
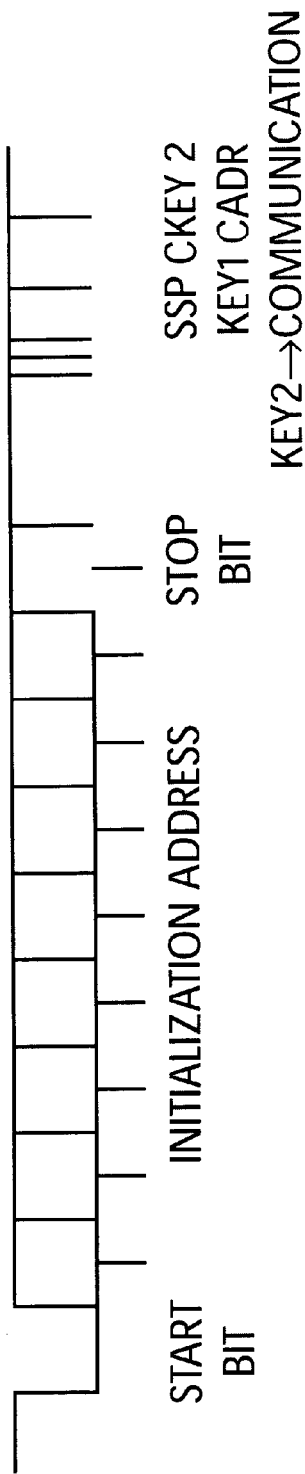
FIG. 2 shows a schematic diagram of the establishment of initialization of the control unit connected to a diagnostic bus according to FIG. 1.
Figure 3:
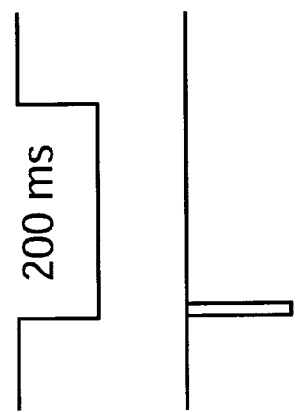
FIG. 3 shows a diagram of bus signals corresponding to a framing error or a signal deviating from the framing error.

The method according to the present invention for initializing control units 13 through 16 connected to diagnostic bus 1 will now be explained in greater detail with reference to FIG. 1 in combination with FIGS. 2 and 3.

The method according to the present invention thus provides for blocking the initialization which must constantly respond to bus signals with respect to rapid communication signals (e.g., 10,417 baud) on the basis of three criteria.

According to the first criteria, during input of the 5-baud address or trigger word, a check is performed during sampling to determine whether the receive register is full (RDRF=1) (RDRF stands for "received data register full": in other words, RDRF is a flag which is set when it has the value "1"). If this is the case, there is a transition from the high logic signal level to the low logic signal level on the K line of the bus. In this case, a 5-baud signal causes a framing error (stop bit has a low logic level, i.e., the stop bit of the receive buffer register is 0). However, a communication at the fast baud rate does not cause a framing error (first criterion). With regard to the form of the corresponding signals, reference is made to FIG. 3, where the top, 200-ms-wide signal represents a framing error ("5 baud/1 bit" byte in the RxD register) while the narrower signal at the bottom corresponds to a signal transmission at 10,417 baud/1 byte in the RxD register.

In other words, during the 5-baud initialization, a filled received byte which has a framing error may be determined. Otherwise, the initialization is discarded and the system waits for a new initialization.

According to the second criterion, monitoring is continued for an additional 100 ms to 400 ms after the end of the 5-baud triggering word until the speed synchronization pattern (SSP) is transmitted. As a result, after sampling for a stop bit, the RxD interface is read out and erased to achieve an "initialization state" of the interface (dummy read). Then until the SSP is sent (with this signal the tester can measure the baud rate of a station on the bus, with the SSP assuming the value "55H" (=55 hex)), a check is performed to determine whether a byte is in the receive register. No byte can be received in this interval of time. If this is nevertheless the case, the initialization is discarded, and the system waits for a new initialization.

According to the third criterion, the initialization module is switched to the "inactive" status as soon as the initialization operation is concluded and a communication is started. The two types of interferences prevented by this operation are interference due to self-sent signals which are "overheard" by the initialization routine and may be incorrectly interpreted as trigger words, and interference due to interpreting signals of other control units connected to the bus as (additional) triggering with functional initialization.

As a result of the method according to the present invention, using a suitable interrogation of the bus line, the K line can be used for both functions together, with physical and functional initialization, instead of using the L line for triggering and the K line for communication as was done previously.

In factory mode, 5-baud triggering is possible in addition to high-speed communication, so that a device which has been incorrectly delivered in factory mode instead of customer mode can be analyzed with a customer's testing device. The above-mentioned aspects of the method according to the present invention support additional interlocks between factory mode and customer mode in the program.

Finally, the aspects discussed above of the method according to the present invention permit a reliable test of whether this is in fact triggering and not diagnostic information over the entire period between the start bit of the 5-baud trigger word and the response of the control unit via SSP, i.e., for approximately 2.1 seconds to 2.4 seconds.

What is claimed is:

1. A method of using a trigger word to initialize a control unit including a microcontroller and coupled to a diagnostic bus for communicating signals over an RxD line of the microcontroller, the microcontroller including a port register and a receive buffer register, the method comprising the steps of:

sampling information from the port register for one of a low logic state and a high logic state as a function of a predetermined sampling cycle to detect the trigger word;

analyzing status information read out from the receive buffer register;

performing a test at a sampling time during an input of the trigger word to determine one of:

whether the receive buffer register is full, and whether a transition from a high logic signal level to a low logic signal level is present on a K line of the diagnostic bus, wherein the trigger word causes a framing error communicated as a stop bit of the receive buffer register; and performing one of the following:

accepting an initialization of the control unit when the framing error is present, and discarding the initialization of the control unit and waiting for another transition from the high logic signal level to the low logic signal level.

2. The method according to claim 1, further comprising the steps of:

inserting a monitoring interval after an end of the trigger word and before a transmission of a speed synchronization pattern;

performing a check to determine whether the transition from the high logic signal level to the low logic signal level is received during the monitoring interval; and discarding the initialization of the control unit when the transition from the high logic signal level to the low logic signal level is received.

3. The method according to claim 2, wherein the monitoring interval has a duration of 100 ms to 400 ms.

4. The method according to claim 1, further comprising the step of switching an initialization module to an inactive status when the initialization of the control unit is concluded and a communication has started.

5. The method according to claim 1, wherein the trigger word includes a 5-baud trigger word.

6. The method according to claim 1, wherein the predetermined sampling cycle is preset at 10 ms.

* * * * *